(12) United States Patent
Habibpour et al.

(10) Patent No.: US 11,898,062 B2
(45) Date of Patent: Feb. 13, 2024

(54) METHOD FOR REPAIRING SURFACE DEFECT WITH A FAST CURING PATCH

(71) Applicant: Illinois Tool Works Inc., Glenview, IL (US)

(72) Inventors: Mehdi Habibpour, Glenview, IL (US); Matt James Lertola, Glenview, IL (US); Carlton G. Seaboldt, Glenview, IL (US); Grant Shouldice, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 23 days.

(21) Appl. No.: 17/466,149

(22) Filed: Sep. 3, 2021

(65) Prior Publication Data

US 2022/0073766 A1 Mar. 10, 2022

Related U.S. Application Data

(60) Provisional application No. 63/075,928, filed on Sep. 9, 2020.

(51) Int. Cl.
*C09D 7/40* (2018.01)
*C09D 167/00* (2006.01)
(Continued)

(52) U.S. Cl.
CPC .............. *C09D 7/70* (2018.01); *B29B 11/14* (2013.01); *B29C 73/06* (2013.01); *B29C 73/10* (2013.01);
(Continued)

(58) Field of Classification Search
CPC ............ B29B 11/14; B29C 2035/0827; B29C 2035/0833; B29C 2073/262;
(Continued)

(56) References Cited

U.S. PATENT DOCUMENTS

| 2,012,935 A | 8/1935 | Smith et al. |
| 3,230,184 A * | 1/1966 | Alford ................... C08K 7/20 |
| | | 521/54 |

(Continued)

FOREIGN PATENT DOCUMENTS

| CA | 2533964 A1 * | 7/2006 | ............ E04F 21/165 |
| EP | 1870228 A1 | 12/2007 | |
| GB | 1198316 A | 7/1970 | |

OTHER PUBLICATIONS

Int'l Search Report for PCT/US2021/049190, dated Jan. 10, 2022.

*Primary Examiner* — Philip C Tucker
*Assistant Examiner* — Jimmy R Smith, Jr.
(74) *Attorney, Agent, or Firm* — MaxGoLaw PLLC

(57) ABSTRACT

A method of repairing a surface defect with a patch is provided. A fibrous substrate is impregnated with a formulation that includes a polyester resin, a crosslinking agent, a solvent, and a particulate filler. The fibrous substrate is contacted with the surface defect. The formulation is exposed to actinic radiation to induce cure of the formulation to form the patch to repair the surface defect. A kit is also provided that includes a bottle containing the formulation. A sheet of fibrous support material is also provided that is adapted to receive the formulation therethrough. Instructions for repairing a surface defect by the aforementioned method are also provided as part of the kit. 3D printing of an article to fit in the surface defect is also disclosed.

17 Claims, 3 Drawing Sheets

(51) Int. Cl.
  *C09D 5/00* (2006.01)
  *C09D 7/61* (2018.01)
  *B33Y 80/00* (2015.01)
  *B29C 73/10* (2006.01)
  *B29C 73/06* (2006.01)
  *B29B 11/14* (2006.01)
  *B29C 35/08* (2006.01)

(52) U.S. Cl.
  CPC .............. *B33Y 80/00* (2014.12); *C09D 5/002* (2013.01); *C09D 7/61* (2018.01); *C09D 167/00* (2013.01); *B29C 35/0805* (2013.01); *B29C 2035/0827* (2013.01)

(58) Field of Classification Search
  CPC ........ B29C 2949/0715; B29C 35/0805; B29C 49/071; B29C 73/06; B29C 73/10; B33Y 10/00; B33Y 80/00; C08K 2003/265; C08K 3/26; C08K 3/346; C08K 7/20; C08L 67/06; C08L 75/14; C09D 167/00; C09D 5/002; C09D 7/61; C09D 7/70
  See application file for complete search history.

(56) References Cited

U.S. PATENT DOCUMENTS

| | | | |
|---|---|---|---|
| 4,009,063 A | 2/1977 | Wood | |
| 4,012,553 A * | 3/1977 | Clemens | B29C 73/00 |
| | | | 442/151 |
| 4,053,448 A * | 10/1977 | Holle | C08K 7/24 |
| | | | 525/49 |
| 4,135,958 A | 1/1979 | Wood | |
| 4,588,626 A | 5/1986 | Cologna et al. | |
| 4,820,564 A | 4/1989 | Cologna et al. | |
| 4,961,799 A | 10/1990 | Cologna et al. | |
| 5,009,941 A | 4/1991 | Pollet et al. | |
| 5,034,254 A | 7/1991 | Cologna et al. | |
| 5,037,689 A | 8/1991 | Boyd | |
| 5,312,651 A | 5/1994 | Takada et al. | |
| 6,068,725 A | 5/2000 | Tweedie et al. | |
| 9,868,265 B2 | 1/2018 | Simmons et al. | |
| 10,294,358 B2 | 5/2019 | Gerard et al. | |
| 2014/0087185 A1 | 3/2014 | Mezzo et al. | |
| 2014/0196833 A1 | 7/2014 | Byron et al. | |
| 2017/0183513 A1* | 6/2017 | Sigel | C08F 299/0492 |
| 2018/0009968 A1 | 1/2018 | Gerard et al. | |
| 2018/0370156 A1 | 12/2018 | Glotin et al. | |

* cited by examiner

METHOD FOR REPAIRING SURFACE DEFECT WITH A FAST CURING PATCH

CROSS REFERENCE TO RELATED APPLICATIONS

This application claims priority benefit of U.S. Provisional Application Ser. No. 63/075,928 filed 9 Sep. 2020, the contents of which are hereby incorporated by reference.

FIELD OF THE INVENTION

The present invention in general relates to a method of surface repair with unsaturated curable formulation, and in particular to a method in surface repair using the formulation with a reinforced patch.

BACKGROUND OF THE INVENTION

A number of devices are known to plug cracks or through holes in settings such as tanks, pipes, land vehicles, and watercraft. However, the prior art devices in many cases cannot be used in connection with hard to bond and complex surfaces. Additionally, the cure times and required surface preparation make existing products inefficient in completing such repairs.

A common practice of repairing damage to surface panels is to form a tapered recess in the composite material around the crack or through hole. Disk-shaped layers of structural fiber cloth of different diameters are typically set into the resulting recess. The fibers of each layer are oriented at a different angle to the fibers of the adjoining layer to improve the strength of the repair. The layers are then secured in place by the use of high strength adhesive. A problem with these adhesives is that they require a long cure time. Also, this method of repair requires a highly trained technician and the repaired area relies totally on the adhesives to transfer the design load across the repair.

While UV curing addresses the speed concerns, conventional UV curing systems had complex laminar structures that limited repairs to dimensions of prepared sheets and resulted in considerable amounts of waste. Such structures are exemplified by U.S. Pat. No. 5,166,007. It is also common that conventional structures only use unfilled resin systems to impregnate a fibrous support and rendered the repairs unsuitable for applications where good sanding properties are required.

Additional factors in achieving repair in a variety of use settings besides speed include the thickness of the damaged substrate, the use environment of substrate, and the need to complete sanding and overcoating to achieve an aesthetically seamless repair. As a result, in some instances a substrate is patched from a reverse side, front side, or both; alternatively, a reverse side patch that projects into the defect has a non-fiber reinforced putty or filler applied to the front side. By way of example, tanks, especially those subjected to vibration often required a sandwich of the substrate between patches, while vehicle and watercraft exterior surfaces require smooth surface finishes for aesthetic and aerodynamic reasons. Conventional repair patches have resulted in the continued exposure of fibers upon sanding.

Thus, there exists a need for improved compositions that address the limitations of the prior art through resort to a one part, UV curable composition provided with a fibrous material that can be impregnated therewith. There further exists a need for a method of using such a composition that is rapidly UV curable to patch surface defects in non-metallic substrates while still having a long enough working time yet is quickly cured by exposure to a UV light source, compared to conventional defect repair systems.

SUMMARY OF THE INVENTION

A method of repairing a surface defect with a patch is provided. A fibrous substrate is impregnated with a formulation that includes a polyester resin, a crosslinking agent, a solvent, and a particulate filler. The fibrous substrate is contacted with the surface defect. The formulation is exposed to actinic radiation to induce cure of the formulation to form the patch to repair the surface defect.

A kit is also provided that includes a bottle containing the formulation. A sheet of fibrous support material is also provided that is adapted to receive the formulation therethrough. Instructions for repairing a surface defect by the aforementioned method are also provided as part of the kit.

BRIEF DESCRIPTION OF DRAWINGS

The present invention is further detailed with respect to the following drawings that are intended to show certain aspects of the present invention but should not be construed as a limit on the practice of the present invention.

DETAILED DESCRIPTION OF THE PREFERRED EMBODIMENTS

Figure 1:
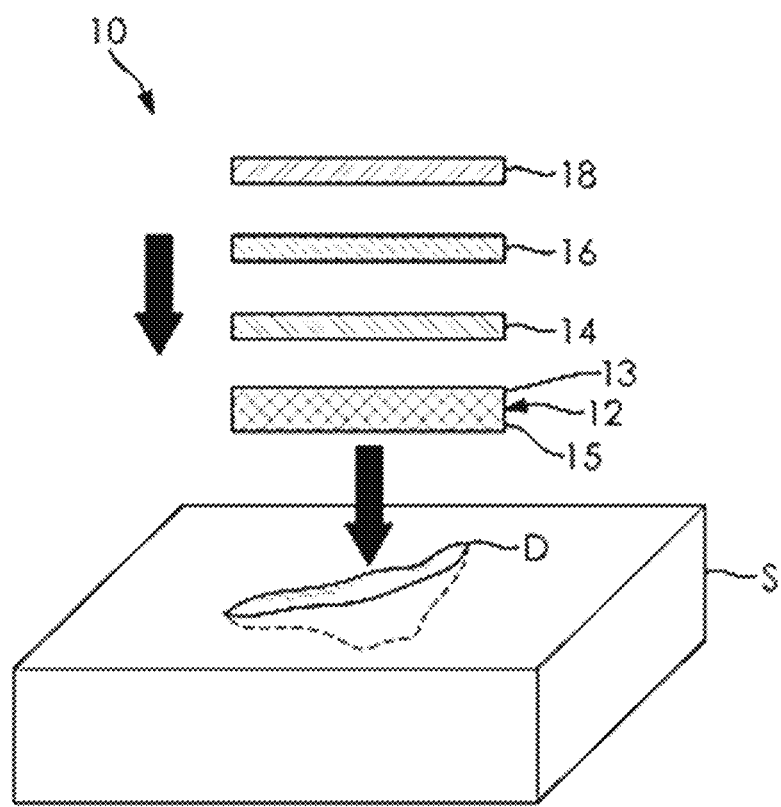
FIG. 1 is an exploded view of a patch system, in which the relative scale of the components have been modified for visual clarity, that includes a fibrous support shaped to cover a defect in a substrate that is impregnated with an inventive formulation, where the impregnation of the inventive formulation extends through the top surface and the bottom surface of the fibrous support in accordance with embodiments of the invention.

The present invention has utility as a method for repairing cracks and holes using reinforced polymer composite materials. The present invention finds utility in various applications such as repair of a boat, a truck, a recreation vehicle, a storage tank, pipes, a vehicle exterior, and non-metal automotive parts. A patch operative in the present invention includes a fibrous support, such as fiberglass cloth and a filled polymer composite material that is impregnates the support. The composite material is pre-applied to the substrate or soaks the support at the time of the repair. The resulting patch is placed on a front side, back side, or a combination thereof relative to the target surface defect and cured with UV-LED light. Upon cure to a hardness to sand, the patch is amenable to being shaped by sanding. In some inventive embodiments, the cured and optionally sanded patch has overlayers applied thereto, such as filler, primer, paint, or a combination thereof. Using the method in the current invention, repairs of large holes and cracks can be carried out with a one part filled and supported thermosetting polymer composite material in a significantly shorter overall repair time relative to conventional systems and using an inexpensive, environmentally-friendly UV-LED light source. Since the composite is a one part system and only is activated with UV-LED light, the application time is infinite, providing any amount of needed working time for a user to carefully position/shape the patch or even correct and rework the repair prior to a then rapid UV cure. With the luxury of working time, limited patch, and in particular fibrous support needs to be removed through sanding as trimming and smoothing can occur before cure.

An inventive method cures, synonymously referred to herein as crosslinking, the repair patch in a significantly shorter time of 1 to 5 minutes, as compared to the prior art. In addition, the curing is carried out by LED lights which are more energy efficient than conventional UV lamps or other external sources and therefore amenable to amateur repairs. Embodiments of the inventive compositions provide fast curing surface imperfection correction utilizing photo polymerization reactions using a variety of light sources such as low energy consuming and environmentally-friendly ultraviolet light emitting diode (UV-LED) and sunlight.

Another feature of the current invention is the essentially infinite working time, synonymously referred to herein as open time, of the patch system as compared to prior art. Absent UV exposure, an inventive composition has a working time that is longer than conventional surface defect repair systems yet cures more rapidly upon UV exposure thereby offering a user a controlled working time and a rapid cure thereafter. As a result, the applied material can be corrected or reworked without the conventional problem of viscosity build. Also, the UV cure of the inventive formulation reduces temperature dependency of cure rates compared to conventional surface defect repair systems.

An inventive system benefits from a filled polymer composite that impregnates the fibrous support and as a result, exhibits superior sanding (shaping) properties after curing in contact with the substrate. As a result, the inventive method is amenable to repairing finished surfaces such as class A surfaces common to vehicle and watercraft exteriors.

By transforming the application method from conventional air drying to UV-curing, the length of the surface repair process in total drops from approximately 15 minutes for conventional material to only 1 to 5 minutes using an inventive composition.

Numerical ranges cited herein are intended to recite not only the end values of such ranges but the individual values encompassed within the range and varying in single units of the last significant figure. By way of example, a range of from 0.1 to 1.0 in arbitrary units according to the present invention also encompasses 0.2, 0.3, 0.4, 0.5, 0.6, 0.7, 0.8, and 0.9; each independently as lower and upper bounding values for the range.

Table 1 lists the major components of an embodiment of the inventive curable composition.

TABLE 1

Formulation of a UV curable vehicle body repair composition

| Ingredient | Typical Total Weight Percent | Preferred Total Weight Percent |
|---|---|---|
| Polyester resin | 10-65 | 30-60 |
| Aliphatic urethane acrylate resin | 1-30 | 4-15 |
| Crosslinking agent | 0-15 | 3-8.2 |
| Photoinitiator | 0.1-3 | 0.3-2 |
| Solvent | 0-20 | 0-10 |
| Additives | 0-5 | Each: 0.1-3 |
| Filler (e.g., pigment, talc, CaCO3, microspheres) | Remainder | Remainder |

An inventive polyester resin has a degree of ethylenic unsaturation that is between 20 and 100% of the non-alcoholic monomer in the polyester resin and denotes reactivity within the polyester resin backbone to free radical polymerization. The unsaturation in a polyester backbone is reactive with vinyl and allyl moieties of a styrenic or non-styrenic molecule through free-radical polymerization.

In some embodiments, an inventive unsaturated polyester resin is terminally functionalized with molecules illustratively including allyl glycidyl ether, glycidyl methacrylate, trimethylolpropane diallyl ether, allyl pentaerythritol or polymeric allyl glycidyl ether.

An inventive unsaturated polyester is readily formed in a single reaction or in multi-stage reactions. Typical reaction temperatures range from 130-240° C. A conventional esterification catalyst is present and illustratively includes acids, transition metal catalysts, and organo-tin compounds. Typical catalyst loadings range from 0.01 to 1 total weight percent of the reactants.

Reactive polyester resins used in a formulation for repairing imperfections on surfaces of auto-body repair coatings have a weight average molecular average weight ranging from 5,000 to 600,000. For purposes of calculating monomer percent, reactive diluents are omitted. Based polyester resin formulations operative herein are detailed in Table 1.

To form a formulation for repairing imperfections on surfaces of auto-body repair coatings, the resulting reactive polyester resin is dissolved in a multifunctional reactive diluent. Reactive diluents operative herein include acrylics, acrylates, and methacrylates such as methyl methacrylate, butyl acrylate, ethyl-hexyl acrylate, hydroxypropyl methacrylate, hydroxyethyl methacrylate, lauryl acrylate, stearyl methacrylate, lauryl methacrylate, butanediol diacrylate, ethyleneglycol dimethacrylate, ethyleneglycol-DCPD methacrylate, ethyl(meth)acrylate, isobutyl(meth)acrylate, cyclohexyl(meth)acrylate, isobornyl(meth)acrylate, benzyl (meth)acrylate, butyleneglycol dimethacrylate, diethyleneglycol dimethacrylate, triethyleneglycol dimethacrylate, propyleneglycol dimethacrylate, dipropyleneglycol dimethacrylate, tripropyleneglycol dimethacrylate and trimethylolpropane triacrylate, or DCPD diacrylate; ether monomers of the structure ($C_1$-$C_6$ alkyl)-O—($C_2$-$C_6$ alkylene) such as ethyl vinyl ether, or methyl vinyl; styrene, $\alpha$-methylstyrene, vinyl toluene, di-functional styrene, allyl substituted benzene, di-vinyl benzene, di- and trifunctional acrylates (commercially available for example as SARTOMER® and MIRAMAR® products), acrylonitrile, mono-vinyl-terminated polydimethylsiloxanes, and combinations of any of the aforementioned. It should be appreciated that a phenyl ring having two moieties in the aforementioned list is intended to include ortho isomers, para isomers, meta isomers, and isomeric mixtures of each.

An actinic radiation curable resin is also present in some embodiments of an inventive composition in the form of an aliphatic urethane acrylate oligomer or polymeric resin. Such resins are readily formed from polyether polyol, a diisocyanate, and hydroxyethyl acrylate. The resin typically has a number average molecular weight of 1,000 to 20,000 Daltons. Diisocyanates operative herein illustratively include dicyclohexyl methane diisocyanate, and isophorone diisocyanate. It is appreciated that aliphatic urethane acrylate resins are typically sold commercially as a 60 to 85% by weight in a diluent such as trimethylolpropane triethoxy triacrylate, pentaerythritol tri/tetracrylate, or the like. Still other actinic radiation curable resins operative herein are detailed in U.S. Pat. No. 5,908,873.

A crosslinking agent that is multifunctional is also present in an inventive composition. As used herein, multifunctional is defined as a compound that has a polymerizable functionality of at least 2. Difunctional crosslinking agents are particularly well suited for use in the present invention. Crosslinking agents operative in the present invention illustratively include diallyl fumarate, diallyl diglycol carbonate, allyl methacrylate, isobornyl acrylate, diallyl phthalate, diallyl suberate, diallyl tetrabromophthalate, diethylene glycol diacrylate, diethylene glycol dimethacrylate, diethylene glycol divinyl ether, N,N'-dimethacryloylpiperazine, 2,2-dimethylpropanediol dimethacrylate, dipentaerythritol pentaacrylate, dipropylene glycol dimethacrylate, di-trimethylolpropane tetraacrylate, divinyl glycol, divinyl sebacate, glycerol trimethacrylate, 1,5-hexadiene, 1,6-hexanediol diacrylate, 1,6-hexanediol dimethacrylate, N,N'-methylenebismethacrylamide, 1,9-nonanediol dimethacrylate, pentaerythritol tetraacylate, pentaerythrtol triacrylate, pentaerythritol triallyl ether, 1,5-pentanediol dimethacrylate, poly(propylene glycol) dimethacrylate, tetraethylene glycol dimethacrylate, triethylene glycol diacrylate, triethylene glycol dimethacrylate, dipropylene glycol diacrylate, triethylene glycol divinyl ether, 1,1,1-trimethylolethane trimethacrylate, 1,1,1-trimethylolpropane diallyl ether, 1,1,1-trimethylolpropane triacrylate, 1,1,1-trimethylolpropane trimethacrylate, tripropylene glycol diacrylate, 1,2,4-trivinylcyclohexane, divinyl benzene, bis(2-methacryloxyethyl) phosphate, 2,2-bis(4-methacryloxyphenyl)propane, 1,3-butanediol diacrylate, 1,4-butanediol diacrylate, 1,3-butanediol dimethacrylate, 1,4-butanediol dimethacrylate, 1,4-butanediol divinyl ether, 1,4-cyclohexanediol dimethacrylate, bis[4-(vinyloxy)butyl]isophthalate, bis[4-(vinyloxymethyl)cyclohexylmethyl]glutarate, bis[-(vinyloxy)butyl]succinate, bis((4-((-vinyloxy)methyl)cyclohexyl)methyl)isophthalate, bis(4-(vinyloxy)butyl)terephthalate, bis[[(4-[vinyloxy)methyl]cyclohexyl]methyl]terephthalate, bis[4-vinyloxy)butyl]adipate, bis[4-(vinyloxy)butyl](methylenedi-1,4-phenylene)biscarbamate, bis-[4-(vinyloxy)butyl](4-methyl-1,3-phenylene)biscarbamate, bis[4-(vinyloxy)butyl]1,6-hexanediylbiscarbamate, tris[4-(vinyloxy)butyl]trimellitate, or combinations thereof. It is appreciated that a minority amount of trifunctional or higher functional crosslinking agent present modifies the cured coating properties. It is appreciated that a reactive diluent, the crosslinking agent, or the combination thereof are operative curing and also serves to render the composition of a viscosity sufficiently low to flow and fill the surface imperfections such as pinholes and surface marring under ambient temperature and pressure application conditions of Standard Temperature and Pressure (STP).

In order to achieve enhanced rates of actinic cure, a photoinitiator is present from 0.1 to 3 total weight percent. Bisacylphosphine oxides (BAPO) are exemplary of a photoinitiator operative in the present invention. Specific bisacylphosphine oxides operative herein illustratively in phenyl bis(2, 4, 6-trimethylbenzoyl)-phosphine oxide, diphenyl(2, 4,6-trimethylbenzoyl)phosphine oxide, bis-(2,6-dichlorobenzoyl)phenylphosphine oxide, bis-(2,6-dichlorobenzoyl)-2,5-dimethylphenylphosphine oxide, bis-(2,6-dichlorobenzoyl)-4-ethoxyphenylphosphine oxide, bis-(2,6-dichlorobenzoyl)-4-biphenylylphosphine oxide, bis-(2,6-dichlorobenzoyl)-4-propylphenylphosphine oxide, bis-(2,6-dichlorobenzoyl)-2-naphthylphosphine oxide, bis-(2,6-dichlorobenzoyl)-1-napthylphosphine oxide, bis-(2,6-dichlorobenzoyl)-4-chlorophenylphosphine oxide, bis-(2,6-dichlorobenzoyl)-2,4-dimethoxyphenylphosphine oxide, bis-(2,6-dichlorobenzoyl)decylphosphine oxide, bis-(2,6-dichlorobenzoyl)-4-octylphenylphosphine oxide, bis-(2,6-dimethoxybenzoyl)-2,5-dimethylphenylphosphine oxide bis-(2,6-dimethoxybenzoyl)phenylphosphine oxide, bis-(2,4,6-trimethylbenzoyl)-2,5-dimethylphenylphosphine oxide, bis-(2,6-dichloro-3,4,5-trimethoxybenzoyl)-2,5-dimethylphenylphosphine oxide, bis-(2,6-dichloro-3,4,5-trimethoxybenzoyl)-4-ethoxyphenylphosphine oxide, bis-(2-methyl-1-naphthoyl)-2,5-dimethylphenylphosphine oxide, bis-(2-methyl-1-naphthoyl)phenylphosphine oxide, bis-(2-methyl-1-naphthoyl)-4-biphenylphosphine oxide, bis-(2-ethyl-1-naphthoyl)-4-ethoxyphenylphosphine oxide, bis-(2-methyl-1-naphthoyl)-2-naphthylphosphine oxide, bis-(2 methyl-1-naphthoyl)-4-propylphenylphosphine oxide, bis-(2-methyl-1-naphthoyl)-2,5-dimethylphosphine oxide, bis-(2-methoxy-1-naphthoyl)-4-ethoxyphenylphosphine oxide, bis-(2-methoxy-1-naphthoyl)-4-biphenylylphosphine oxide, bis-(2-methoxy-1-naphthoyl)-2-naphthylphosphine oxide, bis-(2-chloro-1-naphthoyl)-2,5-dimethylphenylphosphine oxide, and combinations thereof. In some inventive embodiments, liquid blends of photoinitiators are provided by dissolving solid bisacylphosphine oxide photoinitiator in another liquid photoinitiator or a photoinitiator blend which is of liquid form.

A critical aspect of the present invention is that the uncured formulation have a viscosity sufficient to impregnate the fibrous support while at the same time being retained on the fibrous support to form a matrix surrounding the fibrous support. Typical uncured formulation viscosities to achieve this balance are between 5000 and 30,000 Centipoise (cP) and measured at 25° C. and assuming the formulation is non-Newtonian in nature.

To further control viscosity and while not intending to be bound by theory, it is believed that solvents can be effective as a dispersive vehicle for the fillers and resins in an inventive formulation prior to curing. During the application of the formulation, solvents aid in achieving an appropriate viscosity by thinning of the formulation. It is appreciated that a cross-linking also has the effect of reducing viscosity and is distinguished from a solvent by being covalently bonded into the resulting cured resin matrix. However, after the coating has been cured, it can be expected that there is no residual solvent. Solvents operative herein illustratively include 2-butoxyethanol, ethylene glycol, ethyl benzene, xylenes, methyl amyl ketone, isopropyl alcohol, propylene glycol monomethyl ether, ethylene glycol monobutyl ether, butanol, paraffins, alkanes, polypropylene glycol, Stoddard solvent, toluene, ethoxylated alkylphenol, 1-methyl-2-pyrrolidinone, or 1-ethylpyrrolidin-2-one. In some inventive embodiments, the solvent is or includes as a constituent hydrocarbons regardless of saturation; alcohols such as alkoxy alcohols, and ketonic alcohols; ketones; esters, such as acetates; glycol ethers; and glycol ether esters; subject to the proviso that the solvent has a molecular weight of less than 300 Daltons. Examples of hydrocarbons operative herein illustratively include toluene, xylene, naphtha, petroleum distillates, ethyl benzene, trimethyl benzenes, and fractions of hydrocarbon mixtures obtained from petroleum refineries. Alcohols operative herein illustratively include ethanol, n-propanol, iso-propanol, n-butanol, iso-butanol, benzyl alcohol, 2-(n-propoxy)ethanol, 2-(n-butoxy)ethanol, 3-(n-propoxy)ethanol, and 2-phenoxyethanol. Ketones operative herein illustratively include acetone, methyl ethyl ketone, methyl n-propyl ketone, methyl n-butyl ketone, and methyl isoamyl ketone. Esters operative herein illustratively include ethyl propanoate, ethyl butanoate, ethyl glycolate, propyl glycolate, butyl glycolate, isoamyl glycolate, methyl acetate, ethyl acetate, n-butyl acetate, isoamyl acetate, and t-butyl acetate. Mixtures of any two or more of these solvents may also be utilized. Mixtures of miscible combinations of any of the aforementioned are also appreciated to be operative herein.

Several additives are readily included in an inventive formulation that illustratively include light and heat stabilizers to maintain clarity of the cured adhesives, adhesion promoters, flow control additives, pigments and dyes, and combinations thereof. Generally, each of the aforementioned additives is independently present from 0.1 to 5 total weight percent.

Filler particulates or fibers operative in the present invention illustratively include talc, alumina trihydrate, calcium sulfate, calcium carbonate, magnesium sulfate, magnesium carbonate, barium sulfate, microspheroids, and the like. A filler or combination of fillers are typically present from 25 to the remainder total weight percent of a complete formulation for application to a substrate, with a typical upper limit being 60 total weight percent. It is appreciated that a pigment and filler can have the same function and in those instances where both are present in a formulation, the amounts of both are cumulative. It is appreciated that fillers impart Newtonian or thixotropic viscosity to the inventive formulation in uncured form and hardness to the resulting cured patch. In some inventive embodiments, the filler particles have a particle size of from 0.5 to 20 microns.

As used herein, a microspheroid is defined to include a hollow microsphere or a solid bead having an aspect ratio of between two normal maximal linear dimensions of between 1 and 1.6. Typically, a spheroid particle is formed of glass or a thermoplastic material. In some inventive embodiments, the microspheroid is within 10 linear dimension percent of spherical and formed of glass. A microspheroid typically has a longest linear dimension of between 20 and 100 microns to improve sandability and reduce density. Microspheroids are typically present from 0.3 to 10 total weight percent and in some inventive embodiments from 1 to 5 total weight percent.

It is appreciated that the composition is readily be reapplied alone or in combination with fibrous support over a cured patch to affect repair of a deep surface defect in the substrate.

The UV radiation necessary for curing can be provided from several sources, including mercury arc lamps and UV-light emitting diodes (UV-LED). Because of the lower consumption of energy, and reduced heating of the substrate, UV-LED curing is often a preferred actinic radiation source for curing relative to a mercury arc lamp. The UV-LED bulbs do not generate ozone, in contrast to the typical UV-bulbs, require less energy, and exhibit a longer lifetime. The absence of mercury also promotes ease of disposal. UV LEDs emissions are at 365 nm, 385 nm, 395 nm, and 405 nm, are each alone or in combination suitable for inducing cure of an inventive formulation. Typical rates of cure for an inventive composition is 1 to 5 minutes for 1 mm thick composition impregnated into 200 g/m$^2$ fibrous substrate.

The fibrous support operative herein in some inventive embodiments are rovings or weaves that are held together by bonding, knitting. In the case of woven, knit, warp knit/weft insertion, nonwoven, or bonded; the fibrous support can have yarns or tape elements that are disposed in a multi-(bi- or tri-) axial direction. The yarns or fibers of the fibrous support illustratively include fiberglass, carbon, polyester, aramid, nylon, natural fibers, and combinations thereof. In some inventive embodiments, the fibrous support is a multi-axial knit. A multi-axial knit has high modulus, non-crimp fibers that can be oriented to suit a combination of shear and compression requirements. The fibers may be monofilament, multifilament, staple, tape elements, or a combination thereof. Glass rovings are well suited for vehicle and watercraft repairs owing to the common usage thereof in these fields, relatively high modulus, and wettability by the resins. E glass is exemplary of fiberglasses operative herein in some inventive embodiments. Typical fiber strength to weight ratios used in an inventive patch system are at least 1 GPa/g/cm$^3$ as measured by standard fiber properties at 20° C. and a modulus of at least 70 GPa.

The present inventive is further detailed with respect to FIG. 1 in which an inventive patch system is shown generally at 10 in exploded view, in which the relative scale of the components has been modified for visual clarity. The system includes a fibrous support 12 that is impregnated with an inventive formulation 14. The inventive formulation 14 is impregnated into the fibrous support 12 and extends through the top surface 13 and the bottom surface 15 of the fibrous support 12. The fibrous support 12 is shaped to cover a defect, D in a substrate S. The substrate S being a thermoset, or a laminate of any of the aforementioned. In some invention embodiments, a veil 16 is impregnated into the inventive formulation 14 extending from the top surface 13. The veil 16 is a second fibrous support of the kind detailed above with respect to support 12, or a thermoplastic sheet, with the proviso that the thermoplastic sheet is transparent to the UV curing wavelengths. In some inventive embodiments, the veil 16 is a finer denier than fibrous support 12. In still other embodiments, an additional layer 18 of filled inventive formulation 14 is applied over the top surface 13 regardless of whether an intermediate veil 16 is present.

Figure 2:
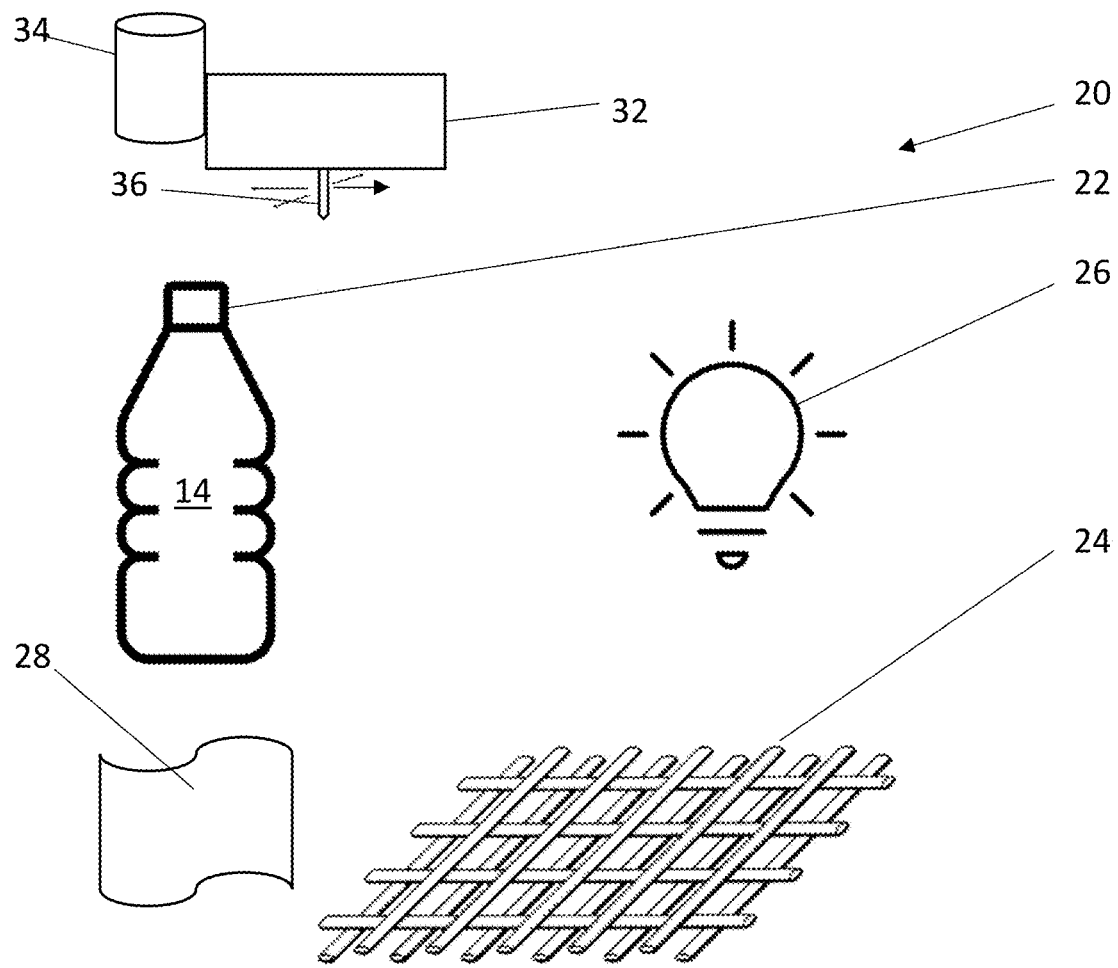
FIG. 2 illustrates a kit that is operative to perform a method of patching a surface defect with the patch system of FIG. 1.

A kit is also provided that is operative to perform the inventive method of patching a surface defect. The kit is shown generally at 20 in FIG. 2. The kit 20 includes a bottle 22 containing the inventive formulation 14 and a sheet of material 24 of the fibrous support 12. The sheet of material 24 is in some embodiments precut into a variety of shapes and sizes. In still other embodiments, the kit 20 also includes a UV LED source 26. Instructions 28 are provided as to how to perform the inventive method using the kit 20. In some embodiments, the kit also includes a three-dimensional (3D) printer 32 as will be detailed below and instructions for the usage thereof for selective application of the inventive formulation 14 and/or to make an article complementary or slightly smaller than the defect D.

Figure 3:
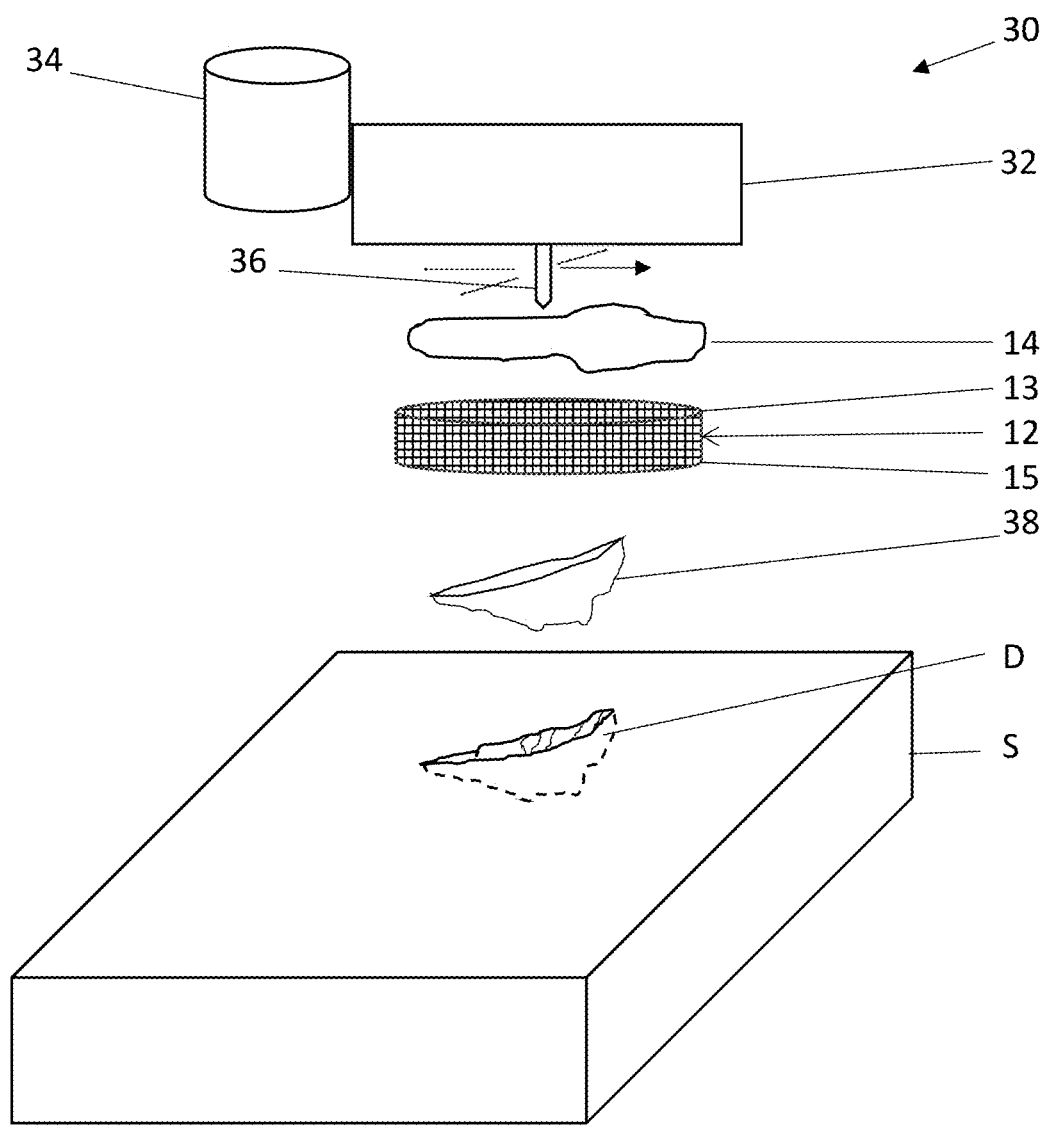
FIG. 3 is an exploded view of a patch system that includes a three-dimensional (3D) printer to selective apply formulation or create an article to dimensioned to the surface defect.

FIG. 3 is an exploded view of a patch system 30, in which the relative scale of the components have been modified for visual clarity and like reference numerals have the aforementioned meaning ascribed thereto and includes a three-dimensional (3D) printer 32 for selective deposition of the inventive formulation 14 onto a fibrous support 12 shaped to cover a defect D in a substrate S that is impregnated with the inventive formulation 14, where the impregnation of the inventive formulation 14 extends through the top surface 13 and the bottom surface 15 of the fibrous support 12. It is appreciated that the veil 16 and the additional layer of formulation 18 are readily used in this inventive method, but are not shown in FIG. 3 for visual clarity.

In still other embodiments, an article 38 is formed by the 3D printer 32 is formed to roughly fit within the contours of the defect D thereby providing a base on which the bottom surface 15 of the fibrous support 12 can rest. It has been discovered that a fibrous support 12 will tend to sag if spanning a defect D with certain dimensions. The factors associated with sag of a support 12 include in part: the weight of the support and formulation, the physical distance spanning at approximately the square of the length spanned, tension applied to edges where support meets the substrate, and viscosity of the formulation. The article 38 is 3D printed from a variety of repair compatible polymers or even metals using a laser sintering 3D printer 32. In usage, the article 38 is simply placed in the defect D and retained with a friction fit, conventional adhesive, or an inventive formulation and then the repair proceeds as detailed with respect to the preceding drawings. It is appreciated that the article 38 besides serving as base for the support 12 can also be formed of materials that function as a hardpoint. By way of example an article 38 can be formed to include a threaded hole to receive a fastener of a conventional dent puller or suction is generated above the article 38 to remove a dent from the substrate S. The fastener in turn is axially tensioned to function as a body dent puller that after fastener removal is then filled and rendered continuous with the body panel.

The 3D printer 32 is connected to a reservoir 34 that contains the inventive formulation 14, or other suitable material for formation of an article 38. A printer head 36, that is able to move sideways and backwards and forwards (as shown by arrows) to selectively deposit the inventive formulation 14, or to create an article 38. A conventional three dimensional laser scanner is operative herein to provide the dimensions of a defect D and provide the data to the printer 32 in a format suitable for printing based on the data. Exemplary of such scanners are those produced by Artec 3D (Luxembourg).

The present invention is further detailed with respect to the following non limiting examples. These examples are not intended to limit the scope of the invention but rather highlight properties of specific inventive embodiments and the superior performance thereof relative to comparative examples.

EXAMPLES

Example 1

An inventive composition is provided based on a polyester resin (47 total weight percent), aliphatic urethane acrylate resin (9 total weight percent), a crosslinking agent of dipropylene glycol diacrylate (4 total weight percent), a TPOL photoinitiator (CAS: 84434-11-7, 1 total weight percent), 11 total weigh percent of 5 micron calcium carbonate, 27 total weight percent of talc powder, and 2 total weight percent of 29 micron average diameter spherical glass microspheroids having a density of 0.22 g/cc and an isostatic crush strength of 2760 KPa. The inventive formulation had a viscosity of 12000-22000 Centipoise (cP) (depending on shear rate) and is impregnated into e-glass fiberglass (200 g/m$^2$ with a plain weave tex of 134 and a fiber diameter of 9 microns, a warp of 9, and a weft of 9) to a thickness of 1 mm is applied over a hole in a vehicle body panel and after exposure to actinic radiation from a UV-LED at 395 nm for 60 seconds to complete cure of the patch to the substrate. The patch sands to a class A finish.

Example 2

The process of Example 1 is repeated with the aliphatic urethane acrylate resin present at 25 total weight percent instead of 9 total weight percent of Example 1. A similar cured patch results.

Example 3

The process of Example 1 is repeated with the TPOL photoinitiator present at 3 total weight percent instead of 1 total weight percent of Example 1. A similar cured patch results.

Example 4

The process of Example 1 is repeated with the calcium carbonate present at 2 total weight percent instead of 11 total weight percent of Example 1. A similar cured patch results.

Comparative Example A

The process of Example 1 is repeated without TPOL and the amount of the polyester resin increased by 1 total weight percent. The resulting patch failed to cure.

Comparative Example B

The process of Example 1 is repeated with the polyester resin reduced to 5 total weight percent, and aliphatic urethane acrylate resin increased to 51 total weight percent. The resulting formulation is too viscous to impregnate the fiberglass.

These examples demonstrate the processes to be claimed in this patent filing. It should be remarked that other additions and modifications as known in the art are also expected to be covered.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A method of repairing a surface defect in a substrate with a patch comprising:
   impregnating a fibrous support with an uncured formulation comprising: a polyester resin, a crosslinking agent, a solvent, and a particulate filler, the uncured formulation having a viscosity sufficient to impregnate the fibrous support while also being retained on the fibrous support to form a matrix surrounding the fibrous support;
   contacting the fibrous support with the surface defect;
   placing an article into the surface defect to underlie the fibrous support prior to the contacting; and
   exposing the uncured formulation to actinic radiation to induce cure of the formulation to form the patch to repair the surface defect.

2. The method of claim 1 further comprising sanding the patch to form a smooth surface.

3. The method of claim 2 further comprising applying an overlayer of a primer or paint on the smooth surface.

4. The method of claim 1 wherein the actinic radiation is emission from an ultraviolet light emitting diode.

5. The method of claim 1 wherein the uncured formulation has a viscosity of between 4,000 and 28,000 Centistokes at standard temperature and pressure.

6. The method of claim 1 wherein the exposing is from 1 to 5 minutes.

7. The method of claim 1 wherein the fibrous support is fiberglass, carbon, polyester, aramid, nylon, natural fibers, or a combination thereof.

8. The method of claim 1 wherein the particulate filler comprises microspheroids having a longest linear dimension of between 20 and 100 microns.

9. The method of claim 1 wherein the particulate filler comprises talc.

10. The method of claim 1 further comprising applying a dent puller fastener or suction to the article to remove a dent from the substrate after the exposing.

11. The method of claim 1 wherein the article is formed by scanning the surface defect to create scan data and three dimensional printing the article based on the scan data.

12. The method of claim 1 wherein the impregnating is done with a three dimensional printer.

13. A kit comprising:
- a bottle containing a formulation comprising: a polyester resin, a crosslinking agent, a solvent, and a particulate filler;
- a sheet of fibrous support material; and
- instructions for repairing the surface defect by the method of claim 1.

14. The kit of claim 13 further comprising a light emitting diode light source emitting ultraviolet wavelengths upon being energized.

15. The kit of claim 13 further comprising a three dimensional printer or instructions how to form the article complementary to the surface defect.

16. A method of repairing a surface defect in a substrate with a patch comprising:
- impregnating a fibrous support with a formulation comprising: a polyester resin, a crosslinking agent, a solvent, and a particulate filler;
- contacting the fibrous support with the surface defect;
- placing an article into the surface defect to underlie the fibrous support prior to the contacting; and
- exposing the formulation to actinic radiation to induce cure of the formulation to form the patch to repair the surface defect.

17. A method of repairing a surface defect in a substrate with a patch comprising:
- impregnating a fibrous support with a formulation comprising: a polyester resin, a crosslinking agent, a solvent, and a particulate filler;
- contacting the fibrous support with the surface defect; and
- exposing the formulation to actinic radiation to induce cure of the formulation to form the patch to repair the surface defect;
- wherein the impregnating is done with a three dimensional printer.

* * * * *